R. J. DUNN.
CALIPERS.
APPLICATION FILED MAY 23, 1917.
1,251,648.
Patented Jan. 1, 1918.
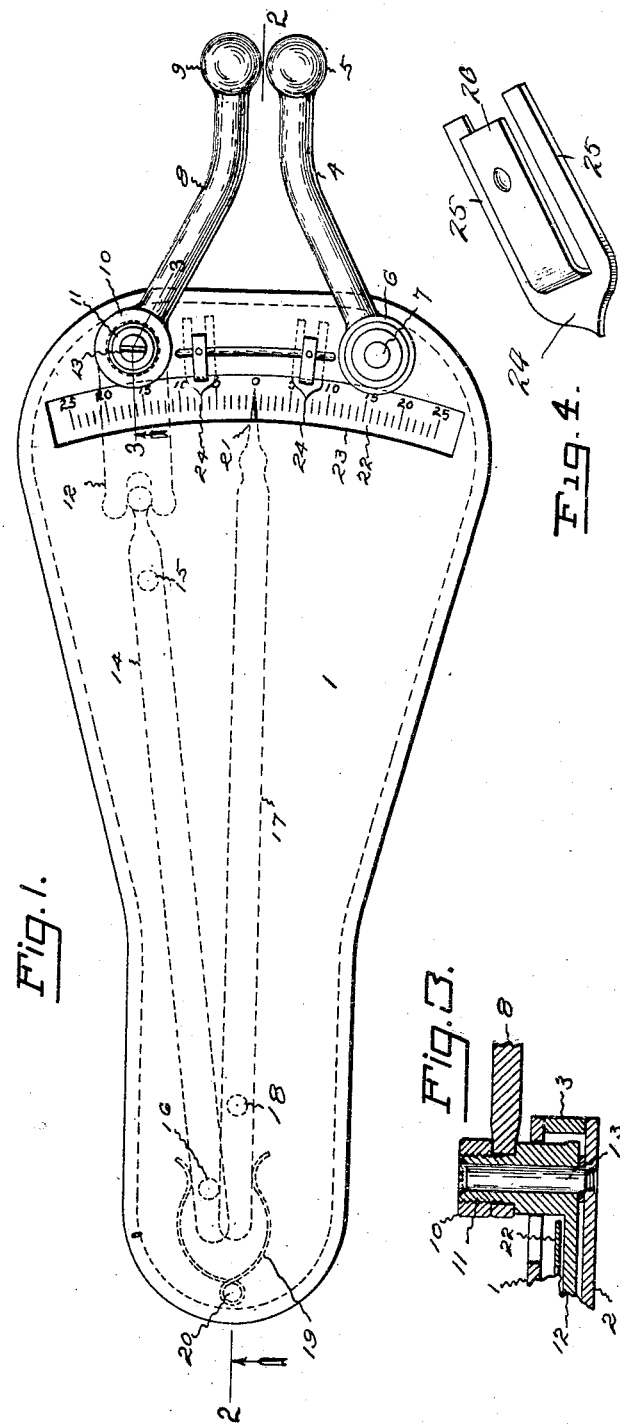
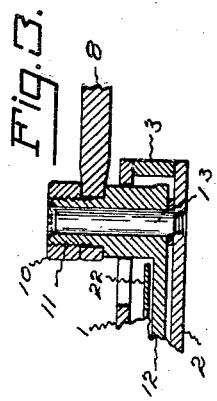
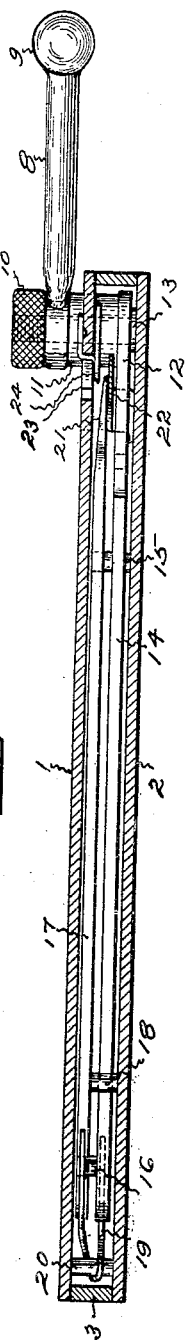
Inventor
Raymond J. Dunn
by
Harry R. Williams
Attorney

UNITED STATES PATENT OFFICE.

RAYMOND J. DUNN, OF HARTFORD, CONNECTICUT.

CALIPERS.

1,251,648.   Specification of Letters Patent.   Patented Jan. 1, 1918.

Application filed May 23, 1917. Serial No. 170,356.

*To all whom it may concern:*

Be it known that I, RAYMOND J. DUNN, a citizen of the United States, residing at Hartford, in the county of Hartford and State of Connecticut, have invented a new and useful Improvement in Calipers, of which the following is a specification.

This invention relates to those calipers which are adapted to be used for indicating whether or not a hole, or a piece, is of a required size, and that have means for automatically showing the amount of variation of the dimensions of a hole, or piece, from those desired.

The object of the invention is to provide a simple and easily manipulated instrument of this nature which is so constructed that exact interior and exterior dimensions may be gaged and very slight variations from exact dimensions will be accurately measured.

The object is attained by adjustably and detachably securing one feeler-finger in a relatively fixed position on the casing, and adjustably and detachably securing the other feeler-finger on a lever that is pivotally mounted on the casing, and connecting the finger-lever by a multiplying-lever with a pointer-lever which is yieldingly retained by a spring in a normal position, and the pointer end of which is given an extended movement over and index-scale when the finger with which it is connected is swung from the position in which it is set.

Figure 1 of the accompanying drawings shows on enlarged scale a plan of an implement which embodies the invention. Fig. 2 shows a longitudinal section of the same on the plane indicated by 2—2 on Fig. 1. Fig. 3 shows a section taken through the parts on the plane of the line 3—3 on Fig. 1. Fig. 4 is a perspective view, on enlarged scale, of a form of indicating pointer that may be used.

The casing, which may have any desired outline and may be made of any suitable material, is shown as formed of a top plate 1, a bottom plate 2, and an edge wall 3. At one end of the instrument a finger 4 with a rounded end 5 is clamped by a thumb nut 6 on a stud 7 that projects upward from the top of the casing. This finger is slightly curved and when the nut is loosened it may be swung on the stud and adjusted to any desired position. If the nut is completely unscrewed from the stud the finger can be removed and turned over,—it being used as shown in the drawings for interior measurement, that is, for calipering the diameter of a hole, and when used for exterior measurement or calipering the diameter of a piece it is reversed from the position shown. A similarly curved finger 8 with rounded end 9 is clamped by nut 10 on the hub 11 of the finger lever 12. This hub is pivotally mounted on a stud 13 which extends upward from the bottom plate of the casing. Engaging the forked end of the finger-lever is the end of the short leg of the multiplying-lever 14 which is pivoted on the stud 15 in the casing. The multiplying-lever near the end of its long leg has a stud 16. The pointer-lever 17 is pivotally mounted on a stud 18 and its short leg is held in engagement with the stud 16 on the lever 14 by a spring 19 which is coiled around a stud 20 and is arranged to yieldingly hold the lever 17 with the pointer 21 at the end of its long leg normally over the zero graduation of the scale 22. This scale is mounted on the bottom plate and shows through a slot 23 in the top plate. Two indicating pointers 24 may be applied in any convenient way so that they may be slid along the edge of the slot in the top plate and located to point to any desired graduations on the scale. The pointers illustrated are stamped from sheet metal in the form of spring clips, each having two limbs 25 and one limb 26 that is bent up from between the other limbs. The limbs 25 are slid under the edge of the plate and the limb 26 is slid over the edge of the plate, the tension of the limbs yieldingly clipping the pointers to the edge of the slot in the plate so that the pointers may be adjusted from place to place as desired, but will remain in the locations to which they are moved.

For interior measurement the fingers are arranged as shown in the drawings. For exterior measurement the thumb nuts are unscrewed and the fingers are turned over so as to curve oppositely. When the device is to be used the rounded ends of the fingers are set the desired distance apart and clamped by tightening the thumb nuts. For interior work a standard micrometer caliper is opened to the required degree and then the ends of the fingers are opened against the jaws of the micrometer. This makes the distance from the outside of one finger end to the outside of the other finger end the exact distance of the required diameter of the opening to be calipered. For exterior work the ends of the fingers are closed toward each other against the edges of a standard gage of the required dimension. When used to caliper the object, if the hole is smaller than the required dimension the movable finger will be closed toward the fixed finger and this causes the levers to swing the pointer over the scale toward the left. When calipering an outside piece if the piece is too large the movable finger is swung away from the fixed finger and this will cause the levers to move the pointer over the scale toward the right. The graduations on the scale may be spaced proportionately to the multiplication of movement incident to the leverage employed so that the pointer will travel a long distance for very slight changes in the relative positions in the ends of the fingers.

The parts of this instrument are simple to make and easy to assemble. The device can be readily set for inside calipering of holes or outside calipering of pieces of any dimensions within the range of adjustment of the fingers, which is large. Very slight variations from exact dimensions of a hole or piece will be shown and can be accurately measured by the pointer which travels over a wide range of the scale. There is always the same resistance to the movement of the fingers, that is, the measurements do not depend on the touch of the individual using the instrument. This instrument may be used as a limit gage. By setting the indicating pointers at a maximum and minimum allowable dimension, if the main pointer swings between the two indicators the user knows that the work is within acceptable limits.

The invention claimed is;

1. A caliper having a casing, a feeler finger fixed to the casing, a feeler finger pivoted to the casing, a finger lever attached to the pivoted finger, a pivoted pointer, a spring retaining the pointer in normal position, a multiplying lever with one end engaged with the finger lever and the other end engaged with the pointer and adapted to transmit movement from the finger lever to the pointer, and a scale over which the end of the pointer travels to indicate the movement of the pivoted finger.

2. A caliper having a casing, a feeler finger adjustably fixed upon the casing, a feeler finger pivoted upon the casing, a finger lever adjustably attached to the pivoted finger, a pivoted pointer, a spring retaining the pointer in normal position, a multiplying lever with one end engaged with the finger lever and the other end engaged with the pointer and adapted to transmit movement from the finger lever to the pointer, and a scale over which the end of the pointer travels to indicate the movement of the pivoted finger.

3. A caliper having a casing, a feeler finger fixed on the casing, a feeler finger pivoted to the casing, a finger lever attached to the pivoted finger, a pivoted pointer, a multiplying lever with one end engaging the finger lever and the other end engaging the pointer, a spring holding the multiplying lever and the pointer in engagement and retaining the pointer in normal position, and a scale over which the end of the pointer travels to indicate the movement of the pivoted finger.

4. A caliper having a casing, a curved finger with a rounded end detachably fixed upon the casing, a lever pivotally mounted in the casing, a curved finger with a rounded end detachably fixed upon said lever, an oscillatory pointer, a lever connecting the first mentioned lever with said pointer and transmitting the movement of the finger to the pointer, a spring retaining the pointer in normal position, and a scale over which the end of the pointer travels to indicate the movement of the pivoted finger.

5. A caliper having a casing, a feeler finger fixed upon the casing, a feeler finger pivoted upon the casing, a finger lever attached to the pivoted finger, a pivoted pointer, a spring retaining the pointer in normal position, a multiplying lever with one end engaged with the finger lever and the other end engaged with the pointer, a scale in the casing and observable from the outside of the casing over which the end of the pointer travels to indicate the movement of the pivoted finger, and indicating pointers movably mounted on the casing adjacent to the scale.

RAYMOND J. DUNN.